(12) United States Patent
Robertson (10) Patent No.: US 11,724,679 B2
(45) Date of Patent: Aug. 15, 2023

(54) BRAKE ACTUATOR INTERFACE WITH TRAILER BRAKE CONTROL

(71) Applicant: Toyota Motor Engineering & Manufacturing North America, Inc., Plano, TX (US)

(72) Inventor: Stephen L. Robertson, Surprise, AZ (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 516 days.

(21) Appl. No.: 16/854,663

(22) Filed: Apr. 21, 2020

(65) Prior Publication Data

US 2021/0323519 A1 Oct. 21, 2021

(51) Int. Cl.
| | |
|---|---|
| *B60T 7/12* | (2006.01) |
| *B60T 8/32* | (2006.01) |
| *B60T 13/74* | (2006.01) |
| *B60T 8/1761* | (2006.01) |
| *B60K 35/00* | (2006.01) |
| *B60D 1/24* | (2006.01) |
| *B60T 7/20* | (2006.01) |
| *B60T 8/172* | (2006.01) |
| *B60T 8/171* | (2006.01) |
| *B60T 8/86* | (2006.01) |
| *B60T 8/17* | (2006.01) |

(52) U.S. Cl.
CPC .............. *B60T 8/321* (2013.01); *B60D 1/24* (2013.01); *B60K 35/00* (2013.01); *B60T 7/12* (2013.01); *B60T 7/20* (2013.01); *B60T 8/1701* (2013.01); *B60T 8/171* (2013.01); *B60T 8/172* (2013.01); *B60T 8/17616* (2013.01); *B60T 8/86* (2013.01); *B60T 13/745* (2013.01); *B60K 2370/16* (2019.05); *B60T 2240/00* (2013.01); *B60T 2250/00* (2013.01); *B60T 2270/10* (2013.01)

(58) Field of Classification Search
CPC ... B60T 8/321; B60T 7/12; B60T 7/20; B60T 8/1701; B60T 8/171; B60T 8/172; B60T 8/17616; B60T 8/86; B60T 13/745; B60T 2240/00; B60T 2250/00; B60T 2270/10; B60T 8/1708; B60T 8/323; B60T 13/662; B60T 13/686; B60D 1/24; B60K 35/00; B60K 2370/16
USPC .......................................................... 701/78
See application file for complete search history.

(56) References Cited

U.S. PATENT DOCUMENTS

| | | | |
|---|---|---|---|
| 3,953,084 A | 4/1976 | Pittet, Jr. et al. | |
| 4,232,910 A | 11/1980 | Snyder | |
| 5,615,930 A | 4/1997 | McGrath et al. | |
| 6,179,390 B1 | 1/2001 | Guzorek et al. | |

(Continued)

*Primary Examiner* — Shardul D Patel
(74) *Attorney, Agent, or Firm* — Snell & Wilmer LLP (57) ABSTRACT

A method for controlling the braking of a towed vehicle by a towing vehicle. The method includes receiving, at or by a brake actuator ECU, deceleration data of the towing vehicle and sensing, using a sensor, a longitudinal deceleration of the towed vehicle. The method also includes generating, at or by the brake actuator ECU, a brake signal based on the deceleration data and the longitudinal deceleration, sending the brake signal from the brake actuator ECU to an electric motor of a brake actuator of the towed vehicle, and applying, by the brake actuator, a hydraulic pressure to brakes of the towed vehicle based on the brake signal.

20 Claims, 6 Drawing Sheets

(56) References Cited

U.S. PATENT DOCUMENTS

| | | |
|---|---|---|
| 6,626,504 B2 | 9/2003 | Harner et al. |
| 6,837,551 B2 | 1/2005 | Robinson et al. |
| 8,463,519 B2 | 6/2013 | McCann |
| 8,887,879 B1 | 11/2014 | Decker, Jr. |
| 9,073,524 B2 | 7/2015 | Cusi |
| 9,150,201 B2 | 10/2015 | Smith et al. |
| 9,764,739 B2 | 9/2017 | Deutsch et al. |
| 10,040,437 B2 | 8/2018 | Albright et al. |
| 2008/0143179 A1 | 6/2008 | Rutherford |
| 2013/0158826 A1* | 6/2013 | Cusi ...................... B60T 8/1708 701/70 |
| 2013/0253814 A1* | 9/2013 | Wirthlin ................ G01G 19/02 701/1 |
| 2014/0288795 A1* | 9/2014 | Albright ................ B60T 8/172 701/70 |
| 2014/0350812 A1* | 11/2014 | Robertson ............. B60T 8/1755 701/70 |
| 2017/0144639 A1 | 5/2017 | Minato et al. |
| 2018/0079395 A1* | 3/2018 | Cekola .................. B60T 8/1708 |
| 2018/0126968 A1* | 5/2018 | Eckert ................... B60T 8/323 |
| 2018/0215358 A1* | 8/2018 | Hall ...................... B60T 8/3205 |
| 2018/0334152 A1* | 11/2018 | Hunt ...................... B60T 8/323 |
| 2019/0039580 A1* | 2/2019 | Shimizu ................ B60T 8/172 |
| 2019/0126753 A1 | 5/2019 | Kulkarni et al. |
| 2019/0217831 A1 | 7/2019 | Viele |
| 2020/0247371 A1* | 8/2020 | Vanantwerp .......... B60T 8/1708 |
| 2020/0247372 A1* | 8/2020 | Vanantwerp ............ B60T 8/174 |
| 2020/0282965 A1* | 9/2020 | Pieronek ............... B60T 8/1708 |

\* cited by examiner

BRAKE ACTUATOR INTERFACE WITH TRAILER BRAKE CONTROL

BACKGROUND

Field

This disclosure relates to an integrated system and method for providing a brake actuator interface for a towing vehicle to control and communicate with a towed vehicle so that the towed vehicle can properly and safely brake based on the braking and controls of the towing vehicle.

Description of the Related Art

Many vacationers and travelers like to tour and sightsee in their cars or vehicles and oftentimes buy or rent a motorhome or a recreational vehicle (RV) to enhance their comfort and enjoyment. For extended vacations, the motorhome or the RV may also be hooked up to tow another vehicle (e.g., their car or vehicle, a cargo trailer, a smaller vehicle, or a sports utility vehicle (SUV)). When parked, the vehicle being towed can be disconnected from the towing vehicle to allow the vacationers and travelers to take excursions or drive into town and have a more mobile, fuel efficient and compact vehicle while the motorhome or the RV is parked at a campground.

In many situations, the vehicle being towed (sometimes referred to as a towed vehicle) is required to have its own brakes. For example, when the motorhome or the RV is towing a cargo trailer, the cargo trailer is required to have its own brakes. Generally, a supplemental braking system is required to be purchased and installed on the towed vehicle.

A number of different companies sell supplemental braking systems for towed vehicles (e.g., www.etrailer.com). Supplemental braking systems generally include an electric brake controller attached to the towed vehicle. The brakes of the towed vehicle are applied upon the electric brake controller receiving a brake signal from the towing vehicle indicating that the brakes of the towing vehicle have been applied.

These additional supplemental braking systems are costly and time consuming to install. Therefore, what is needed is an integrated system and method for providing a brake actuator interface for a towing vehicle to control and communicate with a towed vehicle so that the towed vehicle can properly and safely brake based on the braking and controls of the towing vehicle.

SUMMARY

In general, one aspect of the subject matter described in this disclosure may be embodied in a method for controlling the braking of a towed vehicle by a towing vehicle. These and other aspects or embodiments may optionally include one or more of the following features. The method includes receiving, at or by a brake actuator ECU, deceleration data of the towing vehicle and sensing, using a sensor, a longitudinal deceleration of the towed vehicle. The method also includes generating, at or by the brake actuator ECU, a brake signal based on the deceleration data and the longitudinal deceleration, sending the brake signal from the brake actuator ECU to an electric motor of a brake actuator of the towed vehicle, and applying, by the brake actuator, a hydraulic pressure to brakes of the towed vehicle based on the brake signal.

One aspect of the subject matter described in this disclosure may be embodied in a method for controlling the braking of a towed vehicle using a towing vehicle. The method includes generating, at or by a trailer brake control unit, a pulse-width modulated (PWM) signal proportional to a brake pressure, a deceleration or a manual input of the towing vehicle. The method also includes mapping, at or by a trailer brake control ECU, the PWM signal to a corresponding deceleration request, receiving, at or by a brake actuator ECU, the deceleration request, and transmitting the deceleration request to an electric motor of a brake actuator of the towed vehicle. The method also includes applying, by the brake actuator, a hydraulic pressure to brakes of the towed vehicle based on the deceleration request.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, vehicles and methods for more accurately controlling and applying the brakes of a flat-towed vehicle. Particular embodiments of the subject matter described in this disclosure may be implemented to realize one or more of the following advantages. A brake actuator interface is provided in a towing vehicle. The brake actuator interface is directly built into the towing vehicle and does not require any additional equipment installation or purchasing. The towing vehicle (e.g., via the brake actuator interface 215 and/or the ECU 210) sends or transmits a brake control signal to the towed vehicle. The towing vehicle is able to control the brakes on the towed vehicle as if the towed vehicle is braking on its own but relative to the braking of the towing vehicle. The towing vehicle may take into account and/or adjust the deceleration of both the towing vehicle and the towed vehicle when controlling the brakes of the towed vehicle. This advantageously allows a better and more controlled braking of the towed vehicle.

Figure 1:
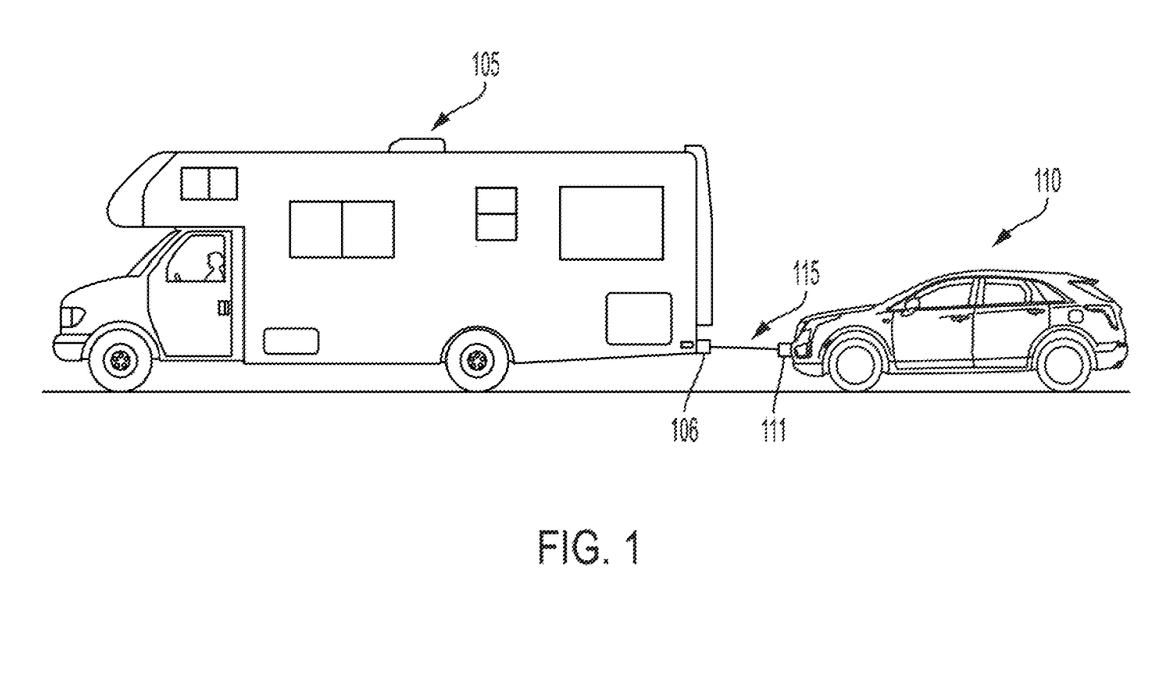
FIG. 1 is an exemplary drawing showing a towing vehicle towing a towed vehicle where the towed vehicle is being flat towed according to an aspect of the invention.

FIG. 1 is an exemplary drawing showing a towing vehicle 105 (e.g., a motorhome or a recreational vehicle (RV)) towing a towed vehicle 110 (e.g., a sports utility vehicle (SUV)) 110 where the towed vehicle 110 is being flat towed (i.e., all wheels are on the ground). A towing rod or bar 115 is generally used to secure and attach the towing vehicle 105 to the towed vehicle 110. The towing vehicle 105 may have a bumper and/or a connector 106 that is used to connect the towing vehicle 105 to the towing rod or bar 115, which is connected to a bumper and/or a connector 111 of the towed vehicle 110.

Figure 2:
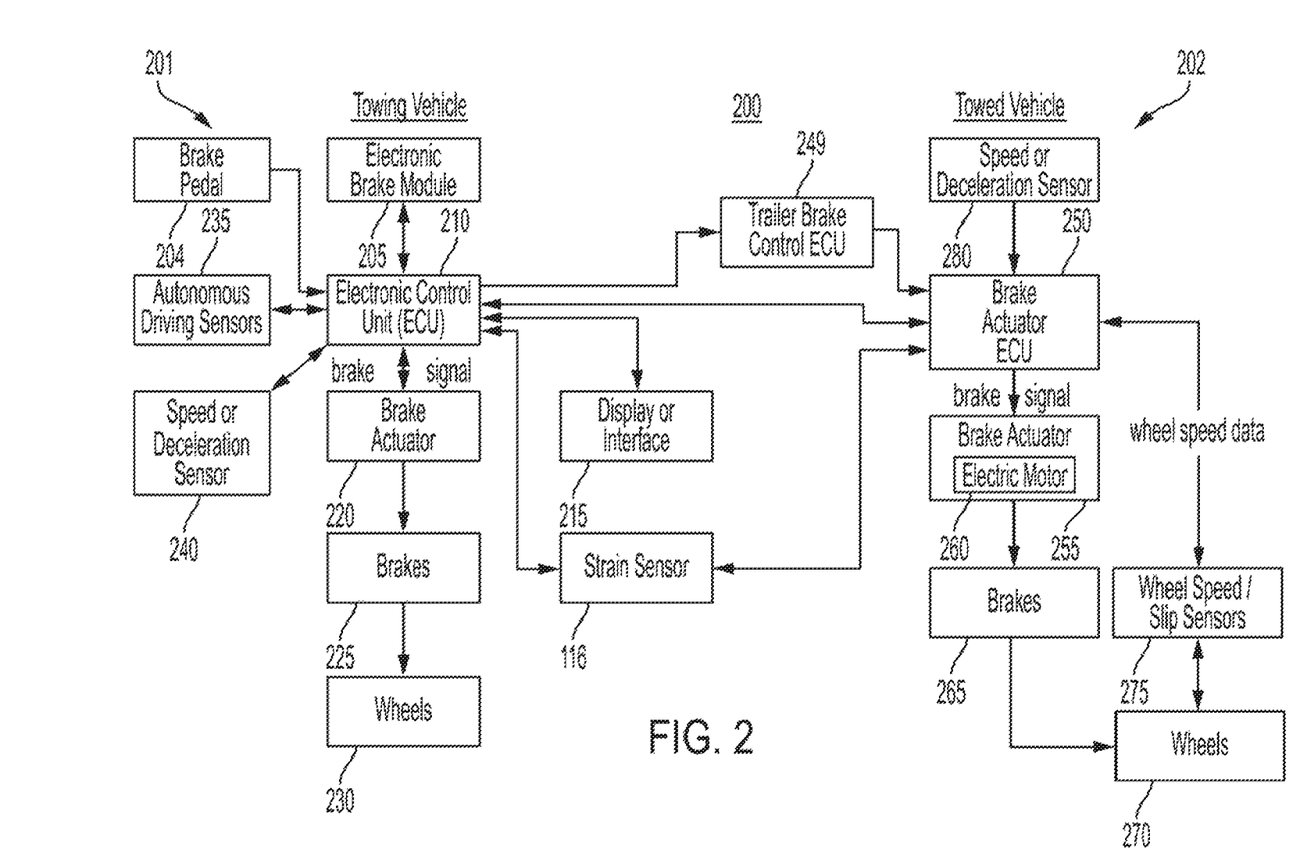
FIG. 2 is a block diagram of an example control system for a towing vehicle to control and communicate with the towed vehicle so that the towed vehicle can properly and safely brake based on the braking and controls of the towing vehicle according to an aspect of the invention.

FIG. 2 is a block diagram of an example control system 200 for a towing vehicle 105 to control and communicate with the towed vehicle 110 so that the towed vehicle 110 can properly and safely brake based on the braking and controls of the towing vehicle 105. The control system 200 may include a first control system 201 and a second control system 202. The first and second control systems 201 and 202 may be retro-fitted, be part of, integrated into, coupled to, include or be included within the towing vehicle 105 and the towed vehicle 110, respectively.

The towing vehicle 105 and the towed vehicle 110 may be a conveyance capable of transporting a person, an object, or a permanently or temporarily affixed apparatus. The towing vehicle 105 and the towed vehicle 110 may be a self-propelled wheeled conveyance, such as a motorhome or a recreational vehicle (RV), a car, a sports utility vehicle, a truck, a bus, a van, a trailer or other motor, battery, or fuel cell driven vehicle. For example, the towing vehicle 105 and the towed vehicle 110 may be an electric vehicle, a hybrid vehicle, a hydrogen fuel cell vehicle, a plug-in hybrid vehicle or any other type of vehicle that has an engine, a fuel cell stack, a motor and/or a generator. Other examples of vehicles include bicycles, trains, planes, or boats, and any other form of conveyance that is capable of transportation. The towing vehicle 105 and the towed vehicle 110 may be a semi-autonomous or autonomous vehicle. That is, the towing vehicle 105 and the towed vehicle 110 may be self-maneuvering and navigate without human input. The semi-autonomous and autonomous vehicle may have and use one or more sensors (e.g., autonomous driving sensors 235) and/or a navigation unit to drive semi-autonomously or autonomously.

The first control system 201 for the towing vehicle 105 may include an electronic brake module or unit 205 ("EBU 205"), an electronic control unit 210 ("ECU 210"), a display or interface 215, a brake actuator 220, brakes 225, wheels 230, autonomous driving sensors 235, and a speed or deceleration sensor 240.

The EBU 205 and the ECU 210 can be separate units or can be combined as a single unit. The EBU 205 and the ECU 210 can each include one or more processors and a memory. The EBU 205 and the ECU 210 may be electrically connected or coupled to some or all the other components including one or more vehicle components of the towing vehicle 105 and the towed vehicle 110. For example, the EBU 205 and/or the ECU 210 may be connected or coupled (wired or wirelessly) to the display or interface 215, the brake actuator 220, the brakes 225, the wheels 230, the autonomous driving sensors 235, and/or the speed or deceleration sensor 240. The ECU 210 may also be referred to as a Trailer Brake Control Unit (TBCU 210). The TBCU 210 can be a built-in, integrated unit.

The display or interface 215 may be integrated into or be inside the passenger compartment of the towing vehicle 105. Preferably, the display or interface 215 is a display or a touch screen viewable by the driver so that the driver can make selections thereon and view the display or interface 215 while driving. The display or interface 215 can also display the amount or percentage of braking currently being activated or actuated on the towing vehicle 105 and/or the towed vehicle 110. For example, the display or interface 215 can display "20% Towed Vehicle" indicating the amount of braking being performed on the towed vehicle 110 is 20% of full braking. The display or interface 215 can also display and indicate if the brakes 265 on the towed vehicle 110 are weak, fading, worn out or non-functioning. For example, the display or interface 215 can display "Check Brakes on Towed Vehicle because Brake Pads are Worn Out." This allows the driver of the towing vehicle 105 to be aware of any potential braking issues with the towed vehicle 110.

Figure 5:
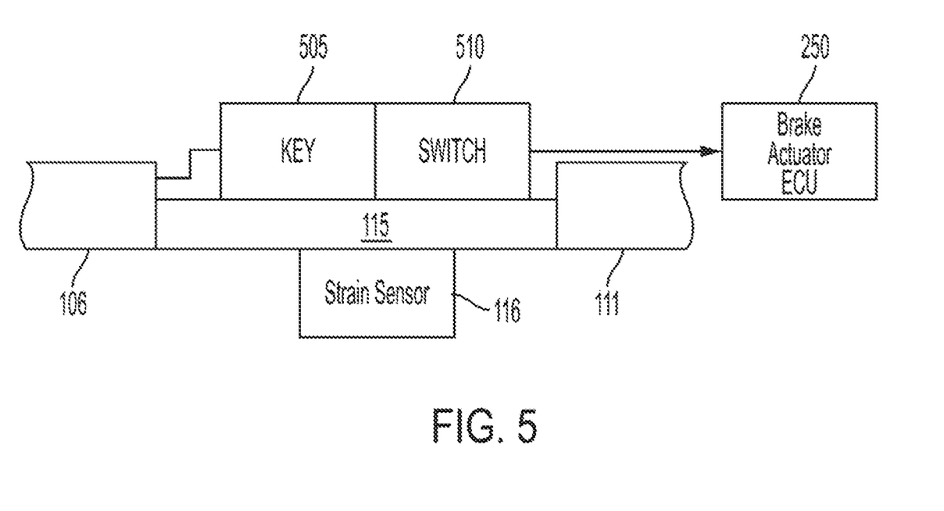
FIG. 5 shows a simplified block diagram showing the connection between the towing vehicle and the towed vehicle according to an aspect of the invention.

The display or interface 215 can also receive and/or display strain information from a strain sensor 116 attached to the towing rod or bar 115 (see also FIG. 5). The strain information can include how much strain is being placed on the towing rod or bar 115, whether the braking of the towed vehicle 110 should be increased, decreased or is correct, and whether a key 505 is connected to or has been disconnected from a switch 510 indicating that the towed vehicle 110 has been disconnected from the towing vehicle 105. When the switch 510 is disconnected from the key 505, the ECU 210 and the brake actuator ECU 250 receive signals indicating that the towed vehicle 110 may be disconnected from the towing vehicle 105. In addition, the display or interface 215 displays a message that the "towed vehicle may be disconnected from the towing vehicle." The strain sensor 116 is wirelessly or wire connected to the EBU 205 and/or the ECU 210.

The strain sensor 116 measures the amount of strain or stress (e.g., pulling, pushing, or stretching) on the towing rod or bar 115 during the braking of the towing vehicle 105. For example, if the towing vehicle 105 is braking more rapidly than the towed vehicle 110 is braking, the towed vehicle 110 will cause a forward pressure on the towing vehicle 105 as measured by the strain sensor 116 and therefore the brakes 265 of the towed vehicle 110 need to be applied with greater force or the braking pressure needs to be increased. Similarly, if the towing vehicle 105 is braking less rapidly than the towed vehicle 110 is braking, the towed vehicle 110 will cause a backward or rearward pressure on the towing vehicle 105 as measured by the strain sensor 116 and therefore the brakes 265 of the towed vehicle 110 need to be applied with lesser force or the braking pressure needs to be decreased. The EBU 205 and/or the ECU 210 continually or periodically (e.g., every 5 seconds or when the brakes 225 of the towing vehicle 105 are being applied) monitor the strain sensor 116 in real-time to determine if and/or when to send a signal to the brake actuator ECU 250 to increase or decrease the braking of the towed vehicle 110.

The brake actuator 220 may include an electric motor that receives a brake signal from the EBU 205 or the ECU 210. The brake signal indicates the amount of brake pressure (e.g., hydraulic pressure) that the brake actuator 220 should apply to the brakes 225 of the towing vehicle 105, which in turn slows down the wheels 230 of the towing vehicle 105. The brakes 225 may include one or more brake discs, brake drums and/or brake rotors.

The autonomous driving sensors 235 sense and communicate information to the EBU 205 and the ECU 210 to assist in driving the towing vehicle 105 in an autonomous or semi-autonomous driving mode. The autonomous driving sensors 235 are also used for adaptive cruise control (ACC)

for the towing vehicle 105. The speed or deceleration sensor 240 detects or measures the speed or deceleration of the towing vehicle 105. The speed or deceleration sensor 240 can be coupled to the speedometer to measure, detect or receive the speed of the lowing vehicle 105.

The second control system 202 for the towed vehicle 110 may include a brake actuator ECU 250, a brake actuator 255 having an electric motor 260, brakes 265, wheels 270, wheel speed/slip sensors 275, and a speed or deceleration sensor 280.

The brake actuator ECU 250 can include one or more processors and a memory. The ECU 250 may be electrically connected or coupled to some or all the other components including one or more vehicle components of the towing vehicle 105 and the towed vehicle 110. For example, the ECU 250 may be connected or coupled to the EBU 205, the ECU 210, the strain sensor 116, the brake actuator 255, the electric motor 260, the brakes 265, the wheels 270, the wheel speed/slip sensors 275, and/or the speed or deceleration sensor 280.

The brake actuator 255 may include the electric motor 260 that receives a brake signal from the brake actuator ECU 250. The brake signal indicates the amount of brake pressure (e.g., hydraulic pressure) that the brake actuator 255 should apply to the brakes 265 of the towed vehicle 110, which in turn slows down the wheels 270 of the towed vehicle 110. The brakes 265 may include one or more brake discs, brake drums and/or brake rotors.

A wheel speed/slip sensor 275 may be coupled to each wheel 270 or a single wheel speed/slip sensor 275 may be coupled to all the wheels 270 of the towed vehicle 110. The wheel speed/slip sensor 275 determines or measures whether the wheel 270 is slipping (e.g., loss of traction due to ice or snow) or is locked (e.g., skidding due to excessive pressure or application of the brakes 265 for the particular road conditions). The speed or deceleration sensor 280 detects or measures the speed or deceleration of the towed vehicle 110. The speed or deceleration sensor 280 can be coupled to the speedometer to measure, detect or receive the speed of the towed vehicle 110.

Figure 3:
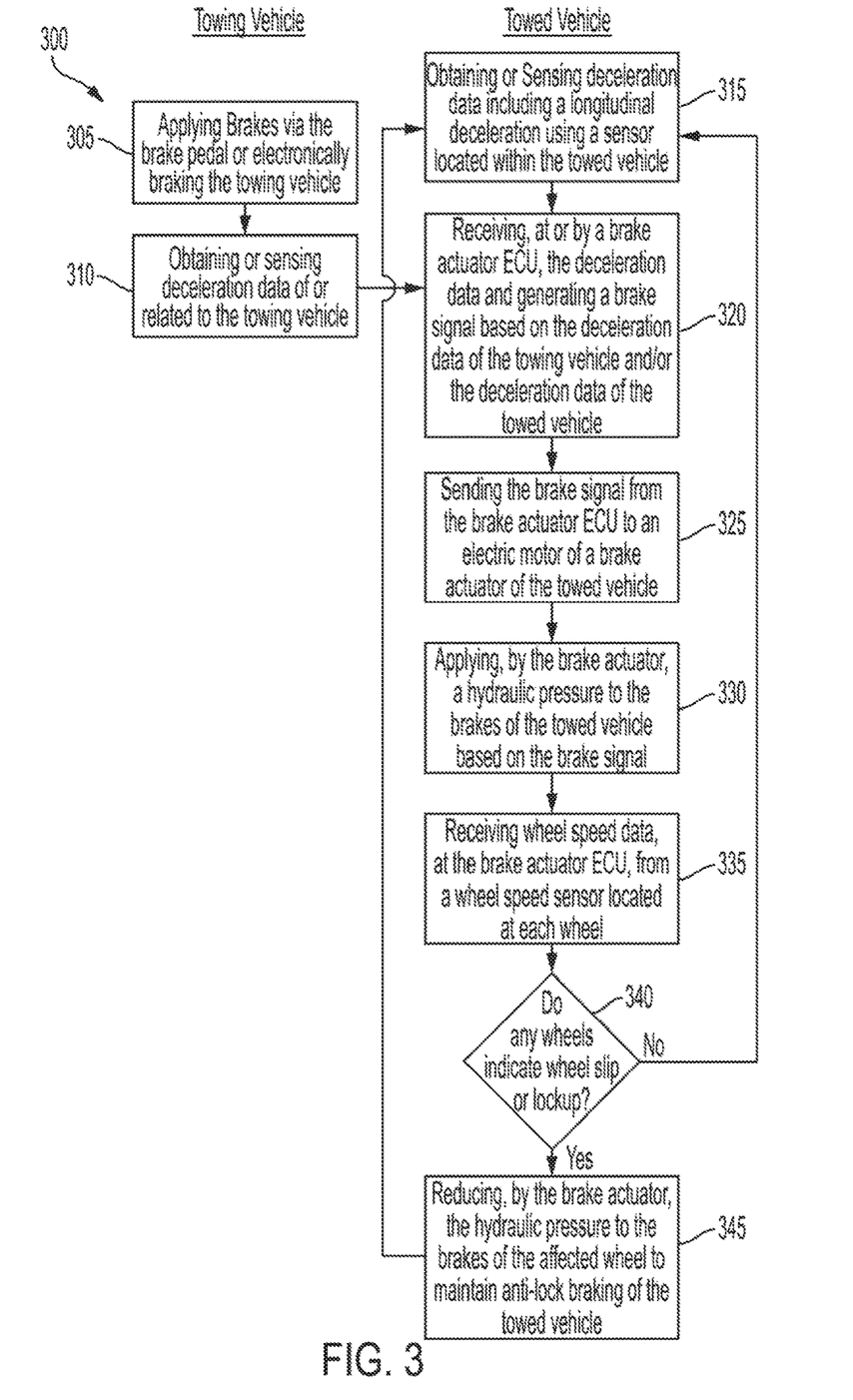
FIG. 3 is a flow chart of a process for the towing vehicle to control and communicate with the towed vehicle so that the towed vehicle can properly and safely brake based on the braking and controls of the towing vehicle according to an aspect of the invention.

FIG. 3 is a flow chart of a process 300 for the towing vehicle 105 to control and communicate with the towed vehicle 110 so that the towed vehicle 110 can properly and safely brake based on the braking and controls of the towing vehicle 105. One or more computers or one or more data processing apparatuses, for example, the EBU 205, the ECU 210, and/or the brake actuator ECU 250 of the control system 200 of FIG. 2, appropriately programmed, may implement the process 300.

When the towing vehicle 105 is towing the towed vehicle 110, the driver of the towing vehicle 105 is in control of the combination of the towing vehicle 105 and the towed vehicle 110. Oftentimes, the driver may need to slow down and accordingly applies the brakes 225 using a brake pedal 204 (305). Once the brake pedal 204 is depressed by the driver, the ECU 210 receives an amount of application of the brake pedal 204 and generates a brake signal that is sent to the brake actuator 220, which in turn applies the brakes 225 of the towing vehicle 105. The brake signal indicates the amount of brake pressure (e.g., hydraulic pressure) that the brake actuator 220 should apply to the brakes 225 of the towing vehicle 105, which in turn slows down the wheels 230 of the towing vehicle 105. The brakes 225 may include one or more brake discs, brake drums and/or brake rotors.

When the towing vehicle 105 is in semi-autonomous or autonomous driving mode, the electronic brake module 205 may generate braking information based on information received from the autonomous driving sensors 235. For example, if the traffic light has turned red, the autonomous driving sensors 235 will sense the red light and then generate braking information based on various factors, including traffic or other vehicles, distance to the red light, current speed of the towing vehicle, etc. The braking information is sent to the ECU 210 for creating or generating a brake signal, which is sent to the brake actuator 220 for applying the brakes 225 of the towing vehicle 105 (305).

The speed or deceleration sensor 240 determines, measures, obtains or senses deceleration data (e.g., the rate at which the vehicle is slowing down, longitudinal deceleration, etc.) of or related to the towing vehicle 105 (310). The speed or deceleration sensor 240 may be an accelerometer located within the towing vehicle 105. The speed or deceleration sensor 280 determines, measures, obtains or senses deceleration data (e.g., a longitudinal deceleration) of or related to the towed vehicle 110 (315). The speed or deceleration sensor 280 may be an accelerometer located within the towed vehicle 110.

The brake actuator ECU 250 receives towing vehicle deceleration data and towed vehicle deceleration data via a wired, wireless, or a controller area network (CAN) and generates a brake signal based on the towing vehicle deceleration data and/or the towed vehicle deceleration data (320). In some situations, the towing vehicle 105 may be decelerating or slowing more rapidly than the towed vehicle 110. Hence, obtaining the deceleration data from both the towing vehicle 105 and the towed vehicle 110 can advantageously assist the brake actuator ECU 250 in determining whether to slightly decrease or increase the brake signal to the brake actuator 255. For example, in this situation, the brake actuator ECU 250 can increase the hydraulic pressure on the brakes 265 in order to make the deceleration rates of both the towing vehicle 105 and the towed vehicle 110 to be similar. The brake actuator ECU 205 continuously receives and monitors the towing vehicle deceleration data and the towed vehicle deceleration data from the speed or deceleration sensor 240 and the speed or deceleration sensor 280, respectively.

The brake actuator ECU 250 sends or transmits the brake signal from the brake actuator ECU 250 to the electric motor 260 of the brake actuator 255 (325). The brake signal may be a value from 1-20, for example, indicating how much hydraulic pressure to apply to the brakes 265. That is, the brake actuator ECU 250 may apply a hydraulic pressure to the brakes 265 based on the brake signal (330). The greater the value, the more hydraulic pressure is to be applied.

Figure 6:
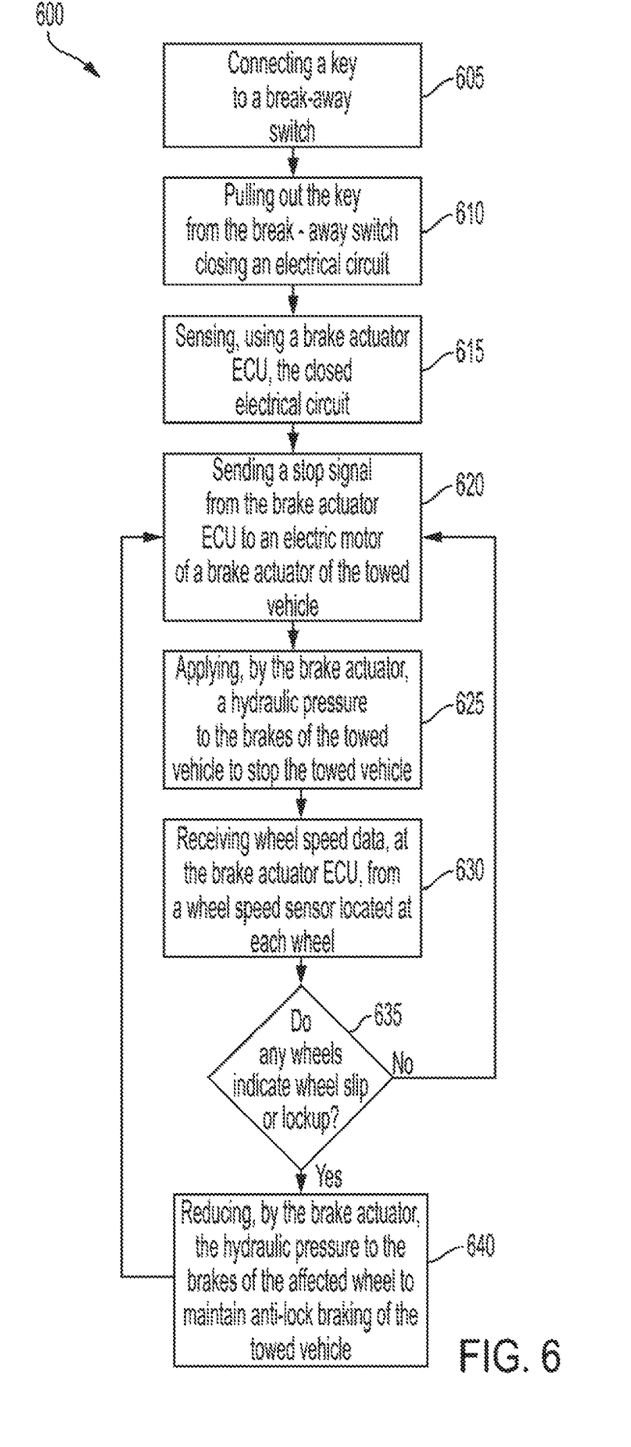
FIG. 6 is a flow chart of a process for notifying the driver of the towing vehicle when the towed vehicle becomes disconnected from the towing vehicle and safely stopping the towed vehicle according to an aspect of the invention.

The brake actuator ECU 250 also continuously or periodically receives wheel speed/slip data from a wheel speed/slip sensor 275 located at each wheel 270 (335, 630). The wheel speed/slip data determines or indicates whether a particular wheel is slipping (e.g., loss of traction due to ice or snow) or is locked (e.g., skidding due to excessive pressure or application of the brakes 265 for the particular road conditions)(340, 635). The brake actuator ECU 250 is also used to adjust the brake signal to maintain vehicle stability control (VSC) and traction control (TRC) of the towed vehicle 110.

If none of the wheels 270 are slipping or locked, the process 300 returns to 315. If one or more of the wheels 270 is slipping or locked, the brake actuator ECU 250 adjusts or decreases the brake signal to reduce the hydraulic pressure to the brakes 265 of the wheel that has slipped or locked in order to maintain anti-locking braking of the towed vehicle 110 (345, 640). The ECU 210 and/or the brake actuator ECU 250 allows and controls the towed vehicle 110 to perform anti-locking braking, moment control, and split-mu stopping of the towing combination. The process 300 (600) returns to 315 (620).

Figure 4:
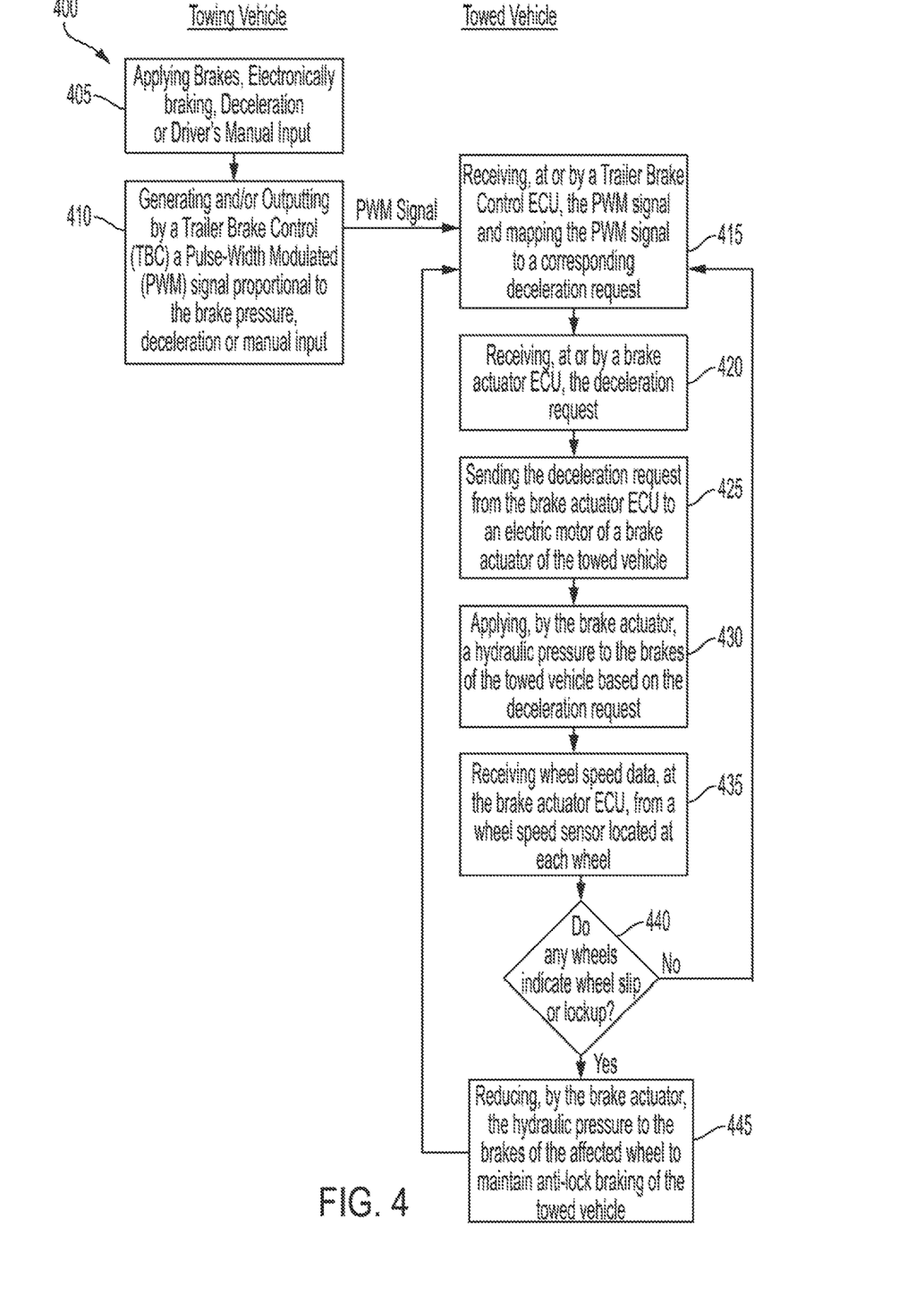
FIG. 4 is a flow chart of a process for the towing vehicle to control and communicate with the towed vehicle so that the towed vehicle can properly and safely brake based on the braking and controls of the towing vehicle according to an aspect of the invention.

FIG. 4 is a flow chart of a process 400 for the towing vehicle 105 to control and communicate with the towed vehicle 110 so that the towed vehicle 110 can properly and safely brake based on the braking and controls of the towing vehicle 105. One or more computers or one or more data processing apparatuses, for example, the EBU 205, the ECU 210, and/or the brake actuator ECU 250 of the control system 200 of FIG. 2, appropriately programmed, may implement the process 400.

When the towing vehicle 105 is towing the towed vehicle 110, the driver of the towing vehicle 105 is in control of the combination of the towing vehicle 105 and the towed vehicle 110. Oftentimes, the driver may need to slow down and accordingly applies the brakes 225 using a brake pedal 204 (405). When the towing vehicle 105 is in semi-autonomous or autonomous driving mode, the electronic brake module 205 may generate braking information based on information received from the autonomous driving sensors 235 (405). The electronic brake module 205 may also receive deceleration data from the speed or deceleration sensor 240 (405).

The braking information may also be manually input by the driver (405). For example, the driver can input, via the display or interface 215, braking information such as stay a minimum distance (MD) plus X feet away from the vehicle ahead where the driver can input X. Hence, the braking information may include MD+X.

The EBM 205 and/or the ECU 210 generates and/or outputs a pulse-width modulated (PWM) signal that is based on and/or proportional to an amount of application of the brake pedal 204, the braking information (e.g., from the autonomous, semi-autonomous, or manually input), and/or the deceleration data (e.g., towing and/or towed) (410).

A trailer brake control ECU 249 may receive the PWM signal from the ECU 210 via a wired, wireless, or a controller area network (CAN)(415). The trailer brake control ECU 249 may be integrated within the towed vehicle 110. The trailer brake control ECU 249 may map the PWM signal to a corresponding deceleration request. The trailer brake control ECU 249 includes one or more processors and a memory. The memory may include a lookup table or an equation in the form of software that is used to map the PWM signal to a corresponding deceleration request. The processor receives the PWM signal and using the lookup table or the equation stored in the memory, maps the PWM signal to a corresponding deceleration request. The trailer brake control ECU 249 is wirelessly, wired, or electrically connected or coupled to the ECU 210 and the brake actuator 250.

The brake actuator ECU 250 sends or transmits, via a wired, wireless or CAN connection, the deceleration request from the brake actuator ECU 250 to the electric motor 260 of the brake actuator 255 (425). The deceleration request may be a value from 1-20, for example, indicating how much hydraulic pressure to apply to the brakes 265. That is, the brake actuator ECU 250 may apply a hydraulic pressure to the brakes 265 based on the deceleration request (430). The greater the value, the more hydraulic pressure is applied.

The brake actuator ECU 250 also continuously or periodically receives wheel speed/slip data from a wheel speed/slip sensor 275 located at each wheel 270 (435). The wheel speed/slip data determines or indicates whether a particular wheel is slipping (e.g., loss of traction due to ice or snow) or is locked (e.g., skidding due to excessive pressure or application of the brakes 265 for the particular road conditions)(440).

If none of the wheels 270 are slipping or locked, the process 400 returns to 415. If one or more of the wheels 270 is slipping or locked, the brake actuator ECU 250 adjusts or decreases the brake signal to reduce the hydraulic pressure to the brakes 265 of the wheel that has slipped or locked in order to maintain anti-locking braking of the towed vehicle 110 (445). The process 400 returns to 415.

FIG. 5 shows a simplified block diagram showing the connection between the towing vehicle 105 and the towed vehicle 110. The towing vehicle 105 may have a bumper and/or a connector 106 that is used to connect the towing vehicle 105 to the towing rod or bar 115, which is connected to a bumper and/or a connector 111 of the towed vehicle 110. FIG. 6 is a flow chart of a process for notifying the driver of the towing vehicle 105 when the towed vehicle 110 becomes disconnected from the towing vehicle 105 and safely stopping the towed vehicle 110.

Referring to FIGS. 1, 5 and 6, the key 505 and the switch 510 are coupled to the towing rod or bar 115 and the combination is used to detect whether the towed vehicle 110 becomes disconnected from the towing vehicle 105. In one embodiment, the key 505 is inserted into the switch 510 (e.g., a break-away switch) and mechanical and electrical connections are established (605). The key 505 is connected to the towing vehicle 105 or the towed vehicle 110 via a wire, cord or rope. The switch 510 is connected to the towed vehicle 110 or the towing vehicle 105 via a wire, cord or rope. When the towed vehicle 110 becomes separated or disconnected from the towing vehicle 105, the key 505 breaks off or becomes disconnected from the switch 510 and closes an electrical circuit of the switch 510 (610).

The brake actuator ECU 250 continuously or periodically monitors or senses the switch 510 (i.e., the electrical circuit) and knows when the key 505 is properly connected to the switch 510 and when the key 505 becomes disconnected from the switch 510 (615). When the key 505 becomes disconnected from the switch 510 and the electrical circuit closes, the ECU 210 and the brake actuator ECU 250 receive disconnect signals indicating that the towed vehicle 110 has become disconnected from the towing vehicle 105. In addition, the display or interface 215 displays a message that the "towed vehicle may be disconnected from the towing vehicle." In one embodiment, when the brake actuator ECU 250 receives the disconnect signal, the brake actuator ECU 250 automatically sends or transmits a stop signal to the electric motor 260 of the brake actuator 255 while also activating the brake lights of the towed vehicle 110 (620). In one embodiment, the brake lights of the towed vehicle 110 is automatically activated according to the brake lights of the towing vehicle 105. The stop signal gradually applies the brakes 265 of the towed vehicle 110 so the towed vehicle 110 comes to a quick but safe stop (625). During the braking process, steps 630, 635, and 640 may be performed which are similar to steps 335, 340, and 345 (described above for FIG. 3). Once the towed vehicle 110 is stopped, the emergency flashing lights of the towed vehicle 110 are automatically activated.

Alternatively, once the display or interface 215 notifies the driver of the towing vehicle 105 of the possible disconnection, the display or interface 215 can prompt the driver to select whether to STOP the towed vehicle 110 or DISREGARD the notice because the driver is able to maneuver the towing vehicle 105 and the towed vehicle 110 to a safe stop. If the driver selects STOP, the brake actuator ECU 250 sends or transmits a stop signal to the electric motor 260 of the brake actuator 255 while also activating the brake lights of the towed vehicle 110 (620). The stop signal gradually applies the brakes 265 of the towed vehicle 110 so the towed vehicle 110 comes to a quick but safe stop (625). Once the towed vehicle 110 is stopped or is traveling at a slow speed (e.g., 20 mph less than the posted speed limit), the emergency flashing lights of the towed vehicle 110 are automatically activated.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for controlling braking of a towed vehicle using a towing vehicle, the method comprising:
    receiving, at or by a brake actuator ECU (electronic control unit) on the towed vehicle, deceleration data of the towing vehicle corresponding to a deceleration request received at or by the towing vehicle;
    sensing, using a sensor on the towed vehicle, a longitudinal deceleration of the towed vehicle corresponding to the deceleration request;
    determining, at or by the brake actuator ECU on the towed vehicle, that the towing vehicle and the towed vehicle decelerated at different deceleration rates in response to the deceleration request, the determining being based on the received deceleration data of the towing vehicle and the sensed longitudinal deceleration of the towed vehicle;
    generating, at or by the brake actuator ECU on the towed vehicle, a brake signal in response to determining that the towing vehicle and the towed vehicle decelerated at the different deceleration rates;
    sending, by the brake actuator ECU on the towed vehicle, the brake signal to an electric motor of a brake actuator on the towed vehicle; and
    applying, by the brake actuator on the towed vehicle, a hydraulic pressure to brakes on the towed vehicle based on the brake signal such that a difference in deceleration rate between the towing vehicle and the towed vehicle is less than a threshold value.

2. The method of claim 1, further comprising:
    receiving, at or by the brake actuator ECU on the towed vehicle, wheel speed data from a wheel speed sensor located at each wheel of a plurality of wheels;
    determining, using a wheel sensor, whether any of the plurality of wheels are slipping or are locked; and
    reducing, by the brake actuator on the towed vehicle, the hydraulic pressure to the brake for the wheel that is slipping or is locked to maintain anti-lock braking of the towed vehicle.

3. The method of claim 1, further comprising receiving, at or by the brake actuator ECU on the towed vehicle, a remote brake signal from an ECU on the towing vehicle based on an autonomous braking of the towing vehicle.

4. The method of claim 1, further comprising providing a display or an interface integrated within the towing vehicle and configured to display a message indicating whether the brakes on the towed vehicle are weak, fading, worn out or non-functioning.

5. The method of claim 1, further comprising providing a strain sensor connected to an ECU on the towing vehicle and configured to be attached to a towing rod or bar that is used to connect the towing vehicle to the towed vehicle.

6. The method of claim 5, further comprising continually or periodically monitoring, by the ECU on the towing vehicle, the strain sensor in real-time to determine when a level of strain greater than a threshold level is being placed on the towing rod or bar to send a signal to the brake actuator ECU on the towed vehicle to increase or decrease the braking of the towed vehicle.

7. The method of claim 5, further comprising providing a display or an interface integrated within the towing vehicle and configured to display strain information from the strain sensor, the strain information including how much strain is being placed on the towing rod or bar, whether the braking of the towed vehicle should be increased, decreased or is correct, or whether a key is connected to or has been disconnected from a switch indicating that the towed vehicle has been disconnected from the towing vehicle.

8. The method of claim 7, further comprising displaying, by the display or the interface, a message indicating that the towed vehicle has been disconnected from the towing vehicle in response to the key being disconnected from the switch.

9. The method of claim 7, further comprising transmitting, by the ECU on the towing vehicle, a disconnect signal to the brake actuator ECU on the towed vehicle in response to the key being disconnected from the switch.

10. The method of claim 9, further comprising automatically sending or transmitting, by the brake actuator ECU on the towed vehicle, a stop signal to the electric motor of the brake actuator on the towed vehicle and automatically activating, by the brake actuator ECU on the towed vehicle, brake lights on the towed vehicle in response to the brake actuator ECU on the towed vehicle receiving the disconnect signal.

11. A method for controlling braking of a towed vehicle using a towing vehicle, the method comprising:
    receiving, at or by a trailer brake control ECU (electronic control unit) on the towed vehicle, a pulse-width modulated (PWM) signal proportional to (i) a brake pressure, (ii) a deceleration or (iii) a manual input of the towing vehicle, the PWM signal generated at or by a trailer brake control unit on the towing vehicle;
    mapping, at or by the trailer brake control ECU on the towed vehicle, the PWM signal to a corresponding deceleration request;
    receiving, at or by a brake actuator ECU on the towed vehicle, the deceleration request;
    transmitting, by the brake actuator ECU on the towed vehicle, the deceleration request to an electric motor of a brake actuator on the towed vehicle;
    applying, by the brake actuator on the towed vehicle, a hydraulic pressure to brakes on the towed vehicle based on the deceleration request;
    determining, at or by the brake actuator ECU on the towed vehicle, that the towing vehicle and the towed vehicle decelerated at different deceleration rates in response to, respectively, the PWM signal and the deceleration request, the determining being based on receiving deceleration data of the towing vehicle and sensing longitudinal deceleration of the towed vehicle;

generating, at or by the brake actuator ECU on the towed vehicle, a brake signal in response to determining that the towing vehicle and the towed vehicle decelerated at the different deceleration rates;

transmitting, by the brake actuator ECU on the towed vehicle, the brake signal to the electric motor of the brake actuator on the towed vehicle; and applying, by the brake actuator on the towed vehicle, the hydraulic pressure to the brakes on the towed vehicle based on the brake signal such that a difference in deceleration rate between the towing vehicle and the towed vehicle is less than a threshold value.

12. The method of claim 11, wherein the mapping the PWM signal to the corresponding deceleration request includes using a lookup table or an equation.

13. The method of claim 11, further comprising:
receiving, at or by the trailer brake control ECU, wheel speed data from a wheel speed sensor located at each wheel of a plurality of wheels;
determining, using a wheel sensor, whether any of the plurality of wheels are slipping or are locked; and
reducing, by the brake actuator on the towed vehicle, the hydraulic pressure to the brake for the wheel that is slipping or is locked to maintain anti-lock braking of the towed vehicle.

14. The method of claim 11, further comprising providing a display or an interface integrated within the towing vehicle and configured to display a message indicating whether the brakes on the towed vehicle are weak, fading, worn out or non-functioning.

15. The method of claim 11, further comprising providing a strain sensor connected to the trailer brake control unit on the towing vehicle and configured to be attached to a towing rod or bar that is used to connect the towing vehicle to the towed vehicle.

16. The method of claim 15, further comprising continually or periodically monitoring, by the trailer brake control unit on the towing vehicle, the strain sensor in real-time to determine when a level of strain greater than a threshold level is being placed on the towing rod or bar to send a signal to the brake actuator ECU on the towed vehicle to increase or decrease the braking of the towed vehicle.

17. The method of claim 15, further comprising providing a display or an interface integrated within the towing vehicle and configured to display strain information from the strain sensor, the strain information including how much strain is being placed on the towing rod or bar, whether the braking of the towed vehicle should be increased, decreased or is correct, or whether a key is connected to or has been disconnected from a switch indicating that the towed vehicle has been disconnected from the towing vehicle.

18. The method of claim 17, further comprising displaying, by the display or the interface, a message indicating that the towed vehicle has been disconnected from the towing vehicle in response to the key being disconnected from the switch.

19. The method of claim 17, further comprising transmitting, by the trailer brake control unit on the towing vehicle, a disconnect signal to the brake actuator ECU on the towed vehicle in response to the key being disconnected from the switch.

20. The method of claim 19, further comprising automatically sending or transmitting, by the brake actuator ECU on the towed vehicle, a stop signal to the electric motor of the brake actuator on the towed vehicle and automatically activating, by the brake actuator ECU on the towed vehicle, brake lights on the towed vehicle in response to the brake actuator ECU on the towed vehicle receiving the disconnect signal.

\* \* \* \* \*